United States Patent
Brito et al.

(10) Patent No.: US 12,187,444 B1
(45) Date of Patent: Jan. 7, 2025

(54) HYBRID AIRCRAFT POWER PLANT

(71) Applicant: PRATT & WHITNEY CANADA CORP., Longueuil (CA)

(72) Inventors: Roberto Brito, Beloeil (CA); Michel Desjardins, St-Hubert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/434,106

(22) Filed: Feb. 6, 2024

(51) Int. Cl.
*B64D 27/33* (2024.01)
*B64D 35/022* (2024.01)
*F16H 3/72* (2006.01)

(52) U.S. Cl.
CPC ........... *B64D 27/33* (2024.01); *B64D 35/022* (2024.01); *F16H 3/724* (2013.01)

(58) Field of Classification Search
CPC ........ B64D 27/33; B64D 35/022; F16H 3/724
See application file for complete search history.

(56) References Cited

U.S. PATENT DOCUMENTS

| 9,050,881 | B2 | 6/2015 | Piazzolla |
| 11,186,378 | B2 | 11/2021 | Dubreuil et al. |
| 11,745,888 | B2 | 9/2023 | Harvey et al. |
| 2019/0061924 | A1* | 2/2019 | Kita ................ B64D 27/10 |
| 2020/0158213 | A1 | 5/2020 | Leque et al. |
| 2022/0033097 | A1 | 2/2022 | Botti et al. |

FOREIGN PATENT DOCUMENTS

| DE | 102021205948 A1 * | 12/2022 | ............. B60K 6/365 |
| EP | 3569845 A1 * | 11/2019 | ........... B64D 27/026 |
| EP | 4011770 B1 * | 10/2023 | ......... B64C 29/0033 |
| WO | WO-2010132913 A2 * | 11/2010 | ............. B62M 11/14 |

* cited by examiner

*Primary Examiner* — Tisha D Lewis
(74) *Attorney, Agent, or Firm* — Norton Rose Fulbright Canada LLP (57) ABSTRACT

The power plant can have a structure; an output shaft connectable to a load, the output shaft rotatable about an axis relative the structure; a thermal engine secured to the structure, the thermal engine having a thermal engine shaft; an electric motor having a stator and a rotor shaft, the stator secured to the structure; an epicyclic gearing having a sun gear coaxial to a ring gear, a plurality of planet gears meshed between the sun gear and the ring gear, and a carrier coaxial to the sun gear and to the ring gear, the sun gear, carrier, and ring gear being rotatable relative the casing structure, the output shaft and the rotor shaft both coupled to the carrier, and the thermal engine shaft coupled to sun gear and the carrier; and an overrunning clutch operable to prevent the rotation of the ring gear in one angular direction.

18 Claims, 6 Drawing Sheets

HYBRID AIRCRAFT POWER PLANT

TECHNICAL FIELD

The application relates generally to hybrid aircraft power plants and, more particularly, to architectures thereof.

BACKGROUND OF THE ART

Hybrid aircraft power plants that include a thermal engine and an electric motor for propelling aircraft can provide operational advantages. However, there are several challenges along the path to fully harnessing this potential. For instance, hybrid aircraft powerplants may benefit from having means to allow either one, or both, of the electric motor or the thermal engine to operate independently from the other in some operation modes, and simultaneously in other modes of operation. While there may be different ways in satisfying such needs, power plant design factors in various considerations, such as limiting production cost and maintenance costs, which may benefit from a design having a lower number of different parts. Moreover, in the case of aircraft applications, there is a concern for increased reliability and weight reduction than in ground-based applications. Such considerations complexify the puzzle of optimizing hybrid power plant architecture for the designers.

SUMMARY

In one aspect, there is provided a hybrid aircraft power plant comprising a structure; an output shaft connectable to a load, the output shaft rotatable about an axis relative the structure; a thermal engine secured to the structure, the thermal engine having a thermal engine shaft; an electric motor having a stator and a rotor shaft, the stator secured to the structure; an epicyclic gearing having a sun gear coaxial to a ring gear, a plurality of planet gears meshed between the sun gear and the ring gear, and a carrier coaxial to the sun gear and to the ring gear, the sun gear, carrier, and ring gear being rotatable relative the casing structure, the output shaft coupled to the carrier, and the thermal engine shaft coupled to the sun gear; an overrunning clutch coupling the ring gear to the structure, the overrunning clutch allowing rotation of the ring gear in a first direction, and preventing rotation of the ring gear in a second direction, the second direction opposite the first direction.

In another aspect, there is provided an aircraft power plant comprising: a casing; an output shaft connected to an air mover, the output shaft rotatable about an axis; a thermal engine having a thermal engine shaft coaxial with the output shaft; an electric motor having a rotor shaft; an epicyclic gearing having a sun gear coaxial to a ring gear and to the output shaft, a plurality of planet gears meshed between the sun gear and the ring gear, and a carrier coaxial to the sun gear and to the ring gear, the sun gear, carrier, and ring gear being rotatable relative the casing structure, the sun gear coupled to the thermal engine shaft, and the carrier coupled to the rotor shaft and to the output shaft; and an overrunning clutch coupled between the ring gear and the casing, the overrunning clutch operable to engage the ring gear to the casing, preventing rotation of the ring gear, when rotated in a direction of rotation corresponding to a direction of rotation of the thermal engine shaft.

In a further aspect, there is provided a hybrid power plant having an output shaft connected to a load, an epicyclic gearing having a sun gear coaxial to a ring gear and to the output shaft, a plurality of planet gears meshed between the sun gear and the ring gear, and a carrier coaxial to the sun gear and to the ring gear, the sun gear, carrier, and ring gear being rotatable about an axis, the sun gear coupled a thermal engine shaft, and the carrier coupled to an electric motor and to the output shaft, and an overrunning clutch preventing rotation of the ring gear in one direction.

DESCRIPTION OF THE DRAWINGS

Reference is now made to the accompanying figures in which.

DETAILED DESCRIPTION

In this specification, the term "connected" may include both direct connection (in which two elements that are connected to each other contact each other) and indirect connection (in which at least one additional element is located between the two elements). Similarly, the terms "coupled" and "engaged" may include both direct coupling or engagement (in which two elements that are coupled to each other contact each other) and indirect connection (in which at least one additional element is located between the two elements). As used herein, the singular forms "a," "an," and "the" are intended to include the plural forms as well, unless the context clearly indicates otherwise.

Figure 1:
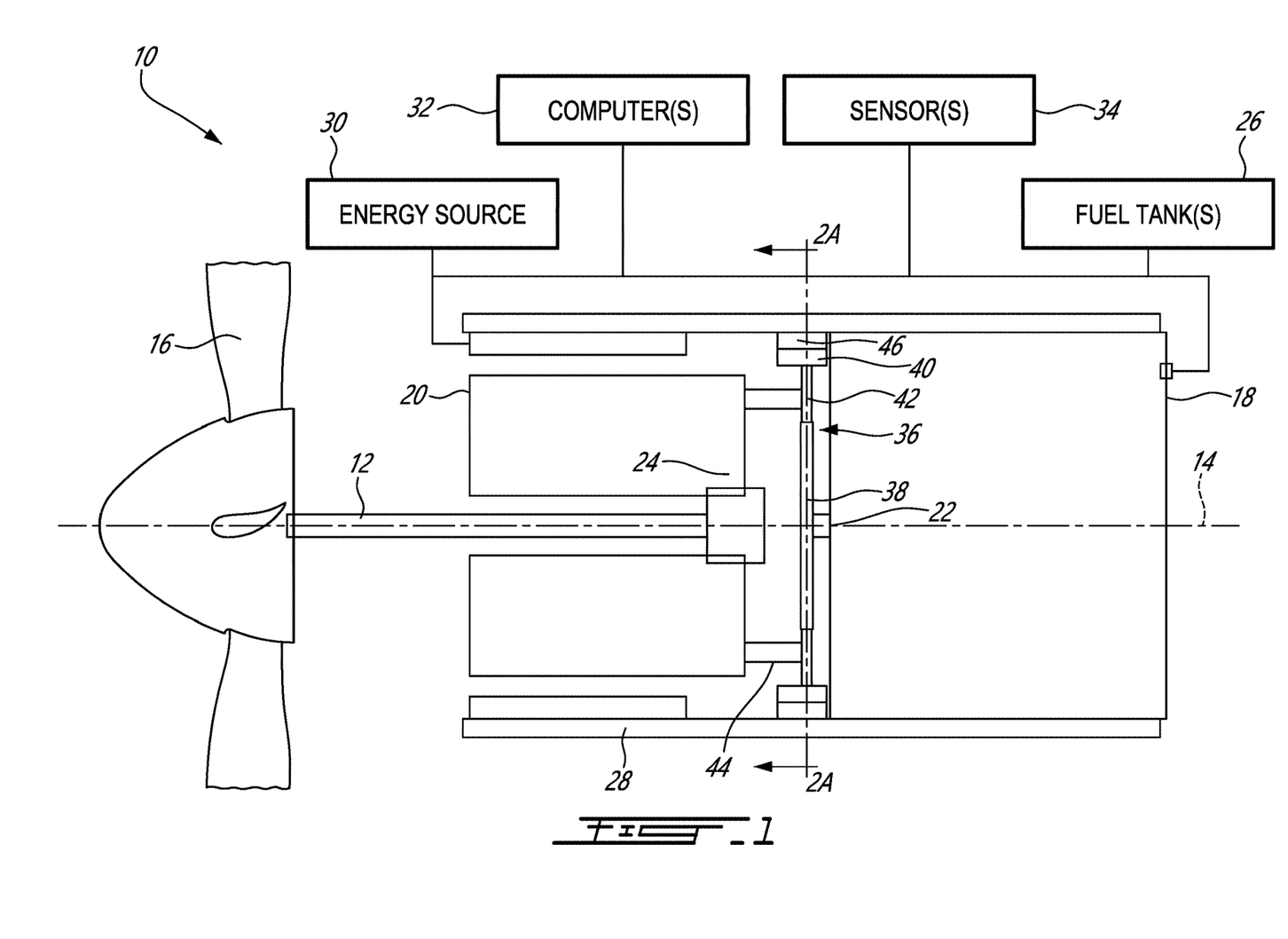
FIG. 1 is a schematic cross-sectional view of a hybrid aircraft power plant.

FIG. 1 is a schematic illustration of an exemplary configuration of power plant 10 being drivingly connected to a propeller 16. The propeller 16 is non-limiting example of a load, and more specifically here a suitable air mover. In this example, the power plant 10 is drivingly connected to the propeller 16 via an output shaft 12. The output shaft 12 rotates about an axis 14. Propeller 16 may be a variable pitch propeller. Power plant 10 may include one or more thermal engines 18 (referred hereinafter in the singular) and one or more electric motors 20 (referred hereinafter in the singular). In some embodiments of power plant 10, thermal engine 18 and electric motor 20 may be arranged in parallel and each be selectively operable to drive the propeller 16 or not independently from the other. More specifically, in the example presented in FIG. 1, the thermal engine 18 has a thermal engine shaft 22, and the electric motor 20 has a rotor shaft 24. An epicyclic gearing 36 couples the thermal engine 18, the electric motor 20 and the output shaft 12, as will be detailed below.

More specifically, the power plant 10 can have a structure 28 which is non-rotary and to which non-rotary portions of components of the power plant 10 such as the thermal engine 18 and the electric motor 20 are secured. The structure 28 can be a casing, cowling and/or housing for instance.

The epicyclic gearing 36 includes a sun gear 38 coaxial to a ring gear 40 around a central axis (axis 14 in the illustrated example), a plurality of planet gears 42 meshed between the sun gear 38 and the ring gear 40, and a carrier 44 coaxial to the sun gear 38 and the ring gear 40. The planet gears 42 are rotatably mounted to the carrier 44, around individual rotation axes which are radially offset from the central axis. In this embodiment, all three of the sun gear 38, the ring gear 40, and the carrier 44 rotate around the central axis. As will be described in greater further below, an overrunning clutch 46 is further provided and prevents the rotation of the ring gear in one (angular) direction, allowing the ring gear to rotate only in the other (angular) direction of rotation.

In this embodiment, the thermal engine shaft 22 is coupled to the sun gear 38. The output shaft 12 and the rotor shaft 24, are both coupled to the carrier 44. In an alternate embodiment, the thermal engine shaft 22 may be coupled to the carrier 44, and the output shaft 12 and the rotor shaft 24 may both be coupled to the sun gear 38.

An overrunning clutch 46 (also known as a freewheel clutch) is provided between the ring gear 40 and the structure 28. The overrunning clutch 46 is a passive, one-way clutch, which disengages the ring gear 40 from the structure 28 automatically, allowing the ring gear 40 to rotate, when the torque in the carrier 44 is greater than the torque provided by the thermal engine (the sun gear 38) (or vice-versa if the thermal engine shaft 22 is coupled to the carrier 44 instead of the sun gear 38). Accordingly, the overrunning clutch 46 may engage and prevent the ring gear 40 from rotating when the power output of the thermal engine 18 is greater than the power output of the electric motor 20 (or more specifically, when the power output of the thermal engine 18 is greater than the sum of the power output of the electric motor 20 and of a potentially non-zero power output of the propeller 16 which may occur when windmilling the propeller 16). More generally, the overrunning clutch 46 may engage to prevent rotation of the ring gear 40 when driven by the thermal engine 18.

Figure 2A:
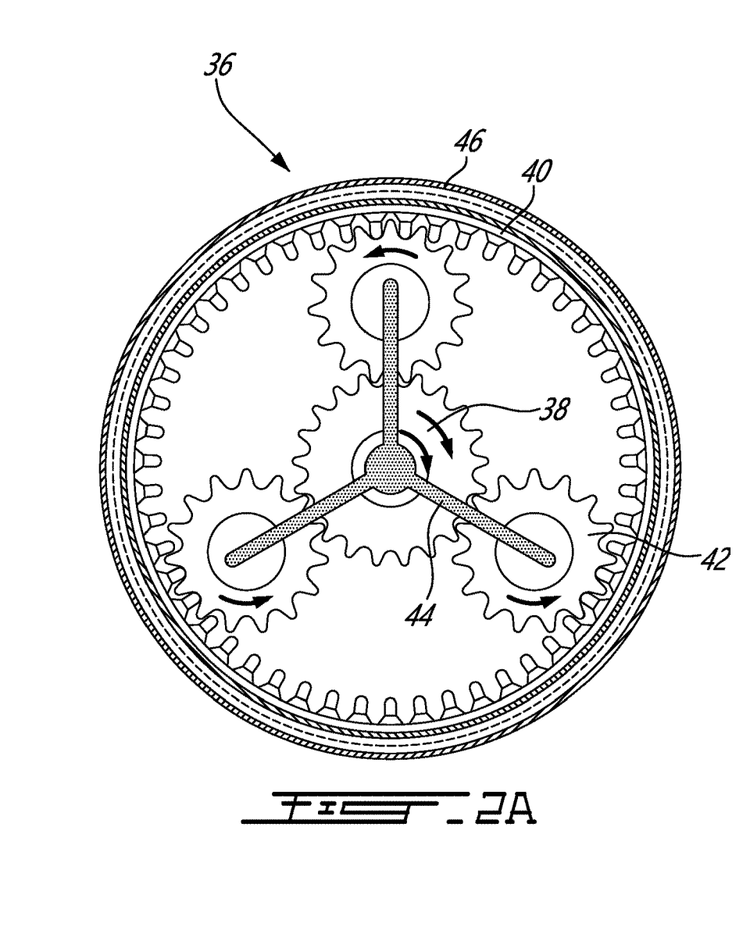
FIGS. 2A and 2B are a cross-sectional views taken along lines 2A-2A of FIG. 1, with FIG. 2A presenting an example thermal mode of operation and FIG. 2B presenting an example purely electric mode of operation.
Figure 2B:
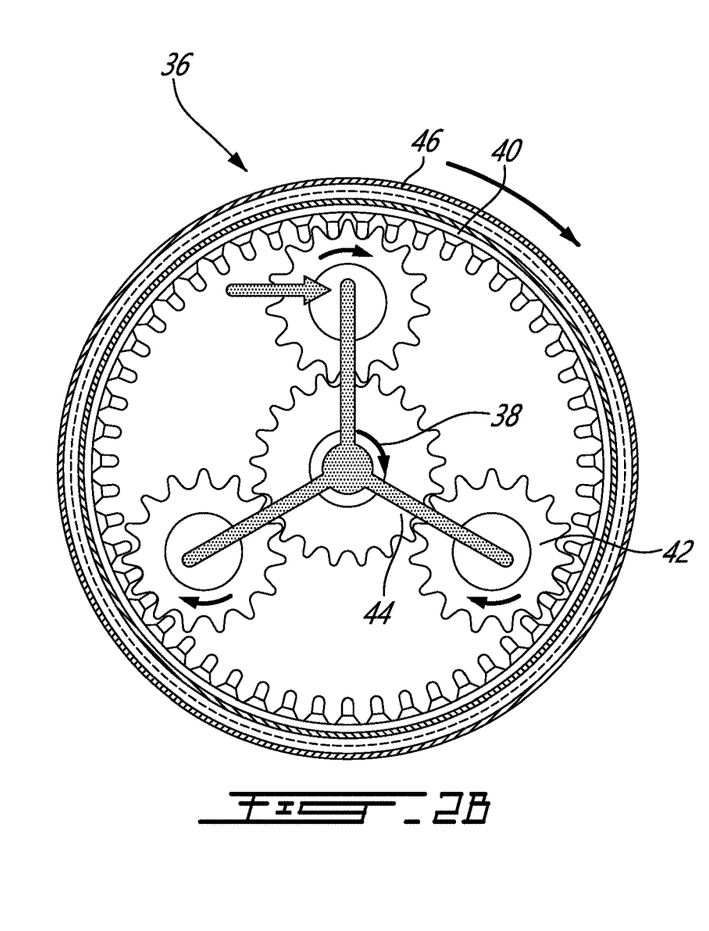

Two potential modes of operation of the power plant 10 are presented in FIGS. 2A and 2B, respectively.

FIG. 2A presents a first mode of operation referred to as a thermal engine mode. In the thermal mode, input torque from the thermal engine 18 is provided at the sun gear 38, rotating the sun gear (here in the clockwise orientation). In this mode, the electric motor 20 does not generate power, and the rotor shaft 24 may thus freewheel. The overrunning clutch 46 locks the ring gear 40 to the structure. The planet gears 42 rotate around their individual axes, revolving around the central axis, and driving the rotation of the carrier 44 around the central axis. The rotation of the carrier 44 may drive the output shaft 12.

It will be noted here that operating the electric motor 20 to output a lesser amount of power than the power outputted by the thermal engine 18 may lead to a similar behavior than the one presented in FIG. 2A, but where the power outputted by the electric motor 20 may add to the power outputted by the thermal engine in driving the propeller 16 at higher power. Similarly, operating the electric motor 20 in generator mode, adding to the load of the propeller 16, while operating the thermal engine 18, may lead to a similar behavior than the one presented in FIG. 2A.

FIG. 2B presents a second mode of operation referred to here as the electric mode. In the electric mode, input torque from the electric motor 20 is provided at the carrier 44, rotating the carrier 44 (here in the clockwise direction). In this mode, the thermal engine 18 is inoperative, and the sun gear 38 therefore does not rotate. The overrunning clutch 46 disengages the ring gear 40 from the structure 28, allowing the ring gear 40 to rotate (here, in the clockwise direction, and in the same direction as the carrier 44). The planet gears 42 rotate around their individual axes, revolving around the central axis. The rotation of the carrier 44 may drive the output shaft 12. Such a mode of operation may be used, for instance, in an electric taxiing portion of the aircraft's mission, and may allow to displace the aircraft on the ground using only electricity as a source of energy, while the thermal engine 18 is entirely shut down.

Overrunning clutches can have a fixed portion and a rotary portion. The fixed portion can engage automatically to the rotary portion when the rotary portion rotates in one direction, and disengage automatically when the rotary portion rotates in the opposite direction. One potential advantage of overrunning clutches is that they do not need to be actively controlled, and therefore may avoid the necessity of using certain sensors, actuators, and/or control schemes. Overrunning clutches may also be mechanically simpler, more reliable, and/or have lower weight and volume than other types of clutches. There are different types of overrunning clutches, including sprag clutches, roller ramp clutches, wrap spring clutches, and wedge styles clutches.

In some embodiments, the overrunning clutch 46 is a sprag clutch. Sprag clutches may offer the feature of being relatively robust, reliable and compact.

There are various suitable ways of incorporating an overrunning clutch 46 between a ring gear 40 and a non-rotary structure 28, some of which will now be presented as examples, referring to FIGS. 3 to 6.

Figure 3:
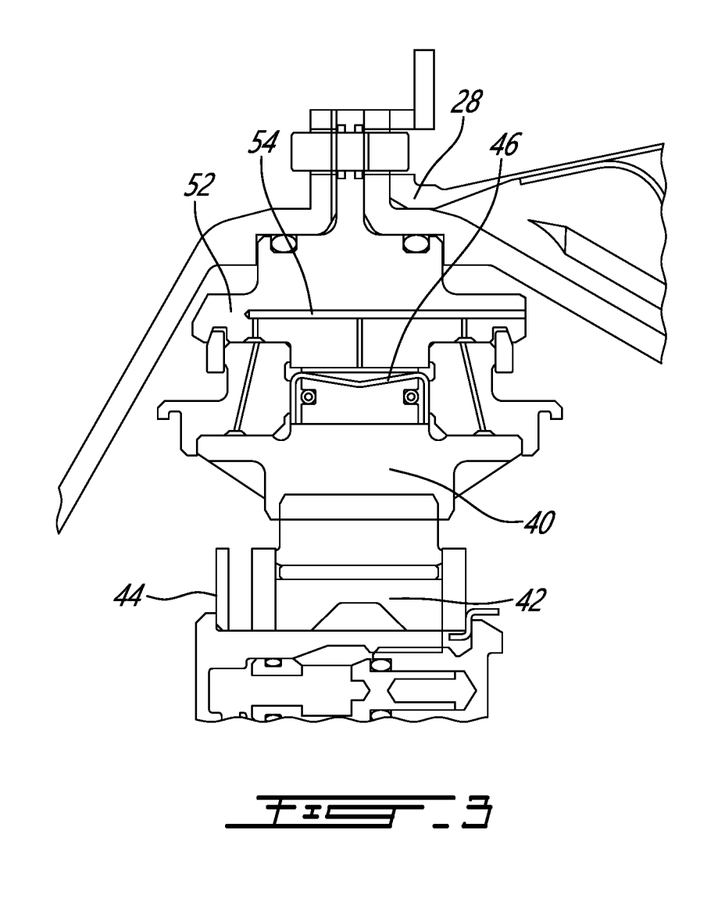
FIGS. 3 to 6 are cross-sectional views showing example embodiments of overrunning clutch arrangements.

In one embodiment presented in FIG. 3, a bearing 52, e.g., a journal bearing or rolling element bearing (e.g. roller bearing, ball bearing), is provided between the ring gear 40 and the structure 28. In this example, the bearing 52 is a journal bearing. Both the bearing 52 and the overrunning clutch 26 may have a non-rotary portion and a rotary portion. The bearing may have one or more bearing element. The non-rotary portion may be secured to the structure 28, and the rotary portion may be secured to the ring gear 40. An overrunning clutch 46 may be integrated to an axially intermediary location of the bearing 52, such as axially between two adjacent elements of the bearing 52. Accordingly, the overrunning clutch 46 may axially overlap bearing 52. A lubricant delivery line 54 may be formed in the non-rotary portion of overrunning clutch 46 and bearing 52, and may be used to convey a lubricant such as oil to both the engagement interfaces of both overrunning clutch 46 and or the bearing 52.

Figure 4:
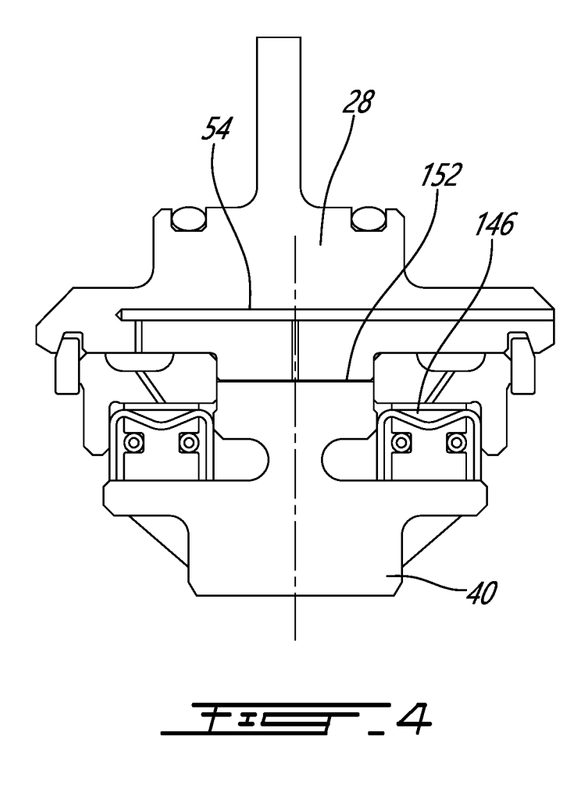

In another embodiment, presented in FIG. 4, the configuration can be comparable to the configuration presented in FIG. 3, except that rather than integrating an overrunning clutch 46 between two axially-interspaced portions of a bearing 52, a bearing 152 is integrated between two axially-interspaced portions of an overrunning clutch 146.

Figure 5:
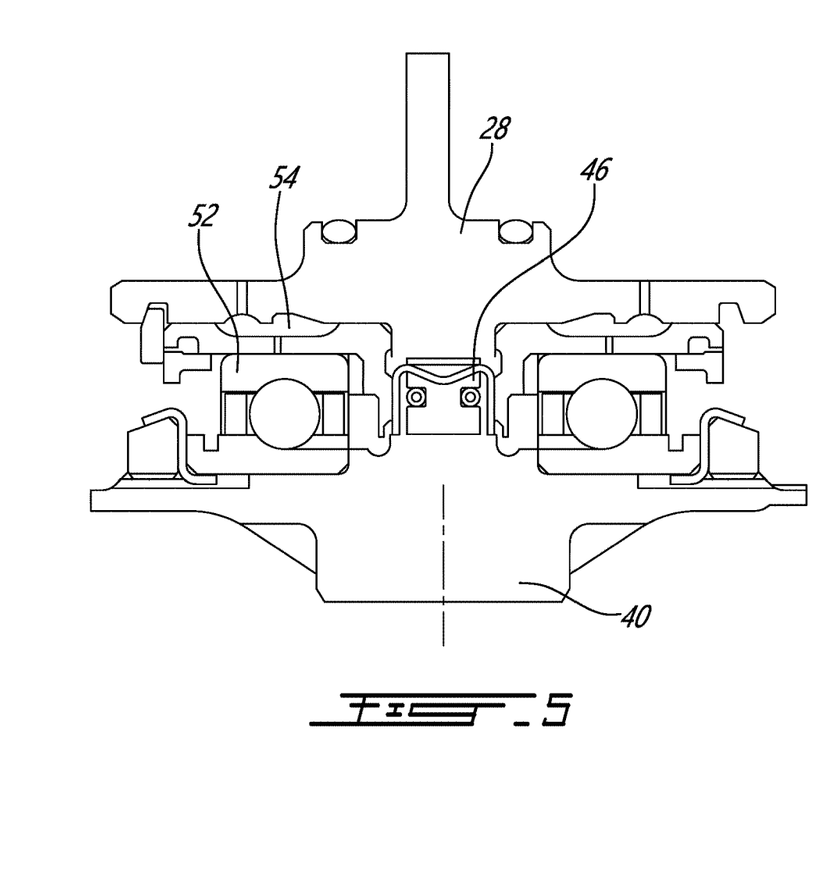

In another embodiment, presented in FIG. 5, the configuration can be comparable to the configuration presented in FIG. 3, except that rolling element bearing portions (shown here as ball bearings) are used instead of journal bearing portions.

Figure 6:
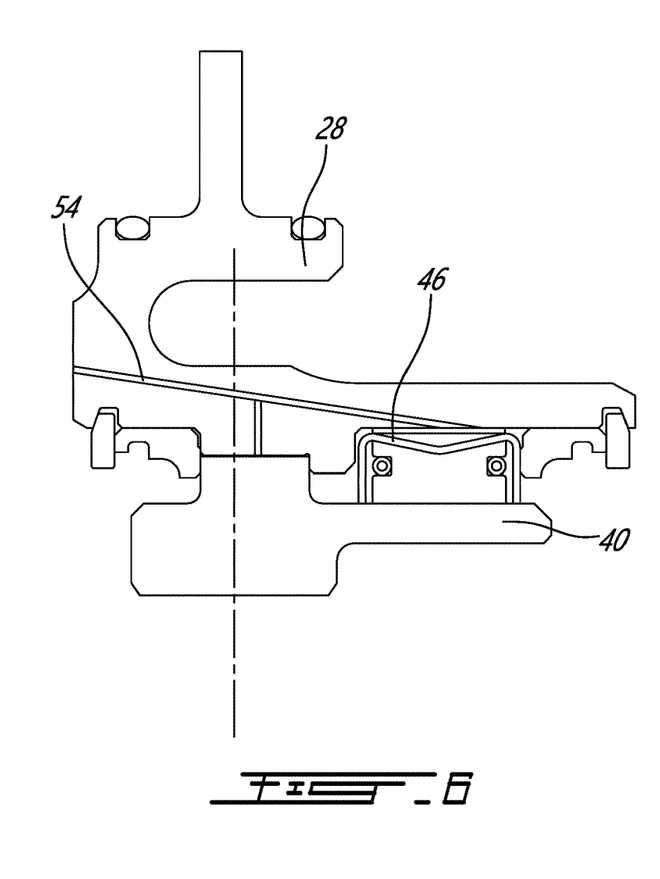

In another embodiment, presented in FIG. 6, the configuration can be comparable to the configuration presented in FIG. 3, except that the bearing 52 and the overrunning clutch 46 may be arranged in an axially adjacent configuration, in a non-symmetrical and non-axially-overlapping manner, rather than in an axially overlapping manner.

Referring back to FIG. 1, it will be noted in this embodiment that the thermal engine shaft 22 is coaxial with the output shaft 12, with the rotor shaft 24, and with the central axis of the epicyclic gearing 36. It will also be noted that the rotor shaft 24 is directly coupled to the epicyclic gearing 36, and that the thermal engine shaft 22 is directly coupled to the epicyclic gearing 36. Alternately, there may be an additional reduction gearing (e.g., an additional epicyclic gearing or another form of reduction gearing), and/or an additional clutch, between either one, or both, of the electric motor 20 and the thermal engine 18 and the epicyclic gearing 36. In this exemplary configuration, the electric motor 20 surrounds the output shaft 12 and axially overlaps with the output shaft 12. The output shaft 12 has two opposite ends which axially protrude from the electric motor 20 including a first end connected to the propeller 16 and a second end connected to epicyclic gearing 36. The first end and the second end are on opposite sides of the electric motor 20 along the axis 14.

Thermal engine 18 may include an (e.g., continuous or intermittent) internal combustion engine. In various embodiments, the thermal engine 18 may include a gas turbine engine, a rotary (e.g., Wankel) engine or a piston engine for example. Thermal engine 18 may generate first torque at thermal engine shaft 22 from the controlled combustion of a suitable fuel stored in fuel tank 26 and supplied to thermal engine 18.

In various embodiments, electric motor 20 may be a permanent magnet synchronous motor, a brushless direct-current (DC) electric motor, or an alternating-current (AC) motor for example. Electric motor 20 may generate torque at the rotor shaft 24 via the conversion of electric energy received from energy source 30. Energy source 30 may be a direct current (DC) electric source used to drive motor 20 via suitable power electronics (e.g., inverter) and motor controller. Energy source 30 may alternately or additionally have an alternating current (AC) electric source. Energy source 30 may include one or more batteries (e.g., battery bank) or supercapacitors for example. Energy source 30 may include one or more lithium-ion batteries, one or more nickel-metal hydride batteries and/or one or more lead-acid batteries to name some potential examples.

In some embodiments, energy source 30 may be rechargeable or otherwise have one or more rechargeable elements. For example, the operation of electric motor 20 as an electric generator may be used to recharge energy source 30 in some situations. In some embodiments, electric motor 20 may be used as a starter for the thermal engine 18.

In some embodiments, power plant 10 may be operated to manage the state-of-charge (SOC) of energy source 30 by the selective operation of electric motor 20 as a motor to draw energy from energy source 30 or as a generator to input energy into energy source 30. Alternatively or in addition, energy source 30 may be recharged using a ground-based source of electric power when aircraft 10 is on ground, such as an AC power supply.

In various embodiments, thermal engine 18 and electric motor 20 may be controlled by one or more controllers implemented by one or more computer(s) 32 (referred hereinafter in the singular). In some embodiments, thermal engine 18 and electric motor 20 may be operated either together or separately to drive propeller 16. In some embodiments, the operation of thermal engine 18 and/or electric motor 20 may be selected based on a phase of flight of aircraft and/or based on an action (e.g., maneuver) to be executed by aircraft. For example, in a phase of flight having a high power requirement, such as during a takeoff phase or a climb phase maneuver of aircraft, both thermal engine 18 and electric motor 20 may be used to cooperatively drive propeller 16. In a leveled cruise phase of flight, only thermal engine 18 may be used to drive propeller 16. For example, during taxiing, i.e., the moving of the aircraft on the ground, at the airport, only electric motor 20 may be used to drive propeller 16.

Computer 32 may be operatively connected to control the operation of thermal engine 18 and output power from thermal engine 18 in part by controlling a fuel flow from fuel tank 26 to thermal engine 18 via a suitable fuel metering unit for example. Computer 32 may be operatively connected to control the operation of motor 20 and output power from thermal engine 18 in part by controlling a delivery of electric current from energy source 30 to thermal engine 18 via suitable power electronics for example.

Power plant 10 may include one or more sensors 34 operatively connected to energy source 30, electric motor 20, thermal engine 18, fuel tank 26, and/or to computer 32. In some embodiments, computer 32 may receive signals indicative of one or more parameters of energy source 30, electric motor 20, thermal engine 18 and/or fuel tank 26, via sensor(s) 34. The signals may be used by computer 32 to control the operation of electric motor 20, thermal engine 18, and/or assess a state of energy source 30, to name some examples. For example, sensor(s) 34 may include one or more voltage sensors, one or more current sensors, one or more torque sensor, one or more rotation speed sensor, and/or one or more temperature sensors.

Computer 32 may also receive inputs from the flight crew commanding the operation of power plant 10. Such inputs may be received from input devices actuatable by the flight crew and may include one or more buttons, switches and/or levers for example. In some embodiments, such input devices may include a throttle input device such as a throttle lever, which may also be referred to as a thrust lever or a power lever depending on the configuration of power plant 10. Throttle lever may be pivotable by the flight crew so that a throttle lever angle (TLA) may be indicative of a desired output power to be generated by power plant 10 and propeller 16. Computer 32 may control thermal engine 18 and/or motor 20 according to the TLA, and based on values measured via sensors 34, so that a desired amount of thrust may be produced via propeller 16.

In an alternate embodiment, an actively controlled clutch may be used instead of an overrunning clutch between the ring gear 40 and the structure 28. In such an embodiment, an actuator may be controlled by the controller to selectively engage or disengage the ring gear to the structure.

It will be noted that an additional reduction gearing, such as another epicyclic gearing (which may be referred to as a second epicyclic gearing for instance), may be provided either between the electric motor 20 and the epicyclic gearing 36 or between the thermal engine 18 and the epicyclic gearing 36.

Epicyclic gearing may offer certain features by contrast with other forms of gearing. In particular, epicyclic gearing may be particularly suitable to coaxial arrangements such as the one presented in FIG. 1. Epicyclic gearing may also offer a certain degree of compactness and/or limited weight for given specifications of reduction, durability, cost, etc.

In some embodiments, it may be suitable to design the power plant for the electric motor to rotate at relatively high rotation speeds, since in some cases, for a same volume and weight of electric motor, a greater power may be achieved by the electric motor if it rotates at higher speeds, potentially achieving greater power density. This may particularly be beneficial in aircraft applications. By using two different reduction gearboxes, the rotation speed of the electric motor may be optimized independently of the optimization of the rotation speed of the thermal engine.

In this embodiment, the output shaft 12 extends axially across the electric motor 20. This configuration can be beneficial in exposing the electric motor 20 at the front of the aircraft, to the airflow generated at the propeller or other air mover, which may be useful in cooling the electric motor 20 during operation, for instance.

Figure 7:
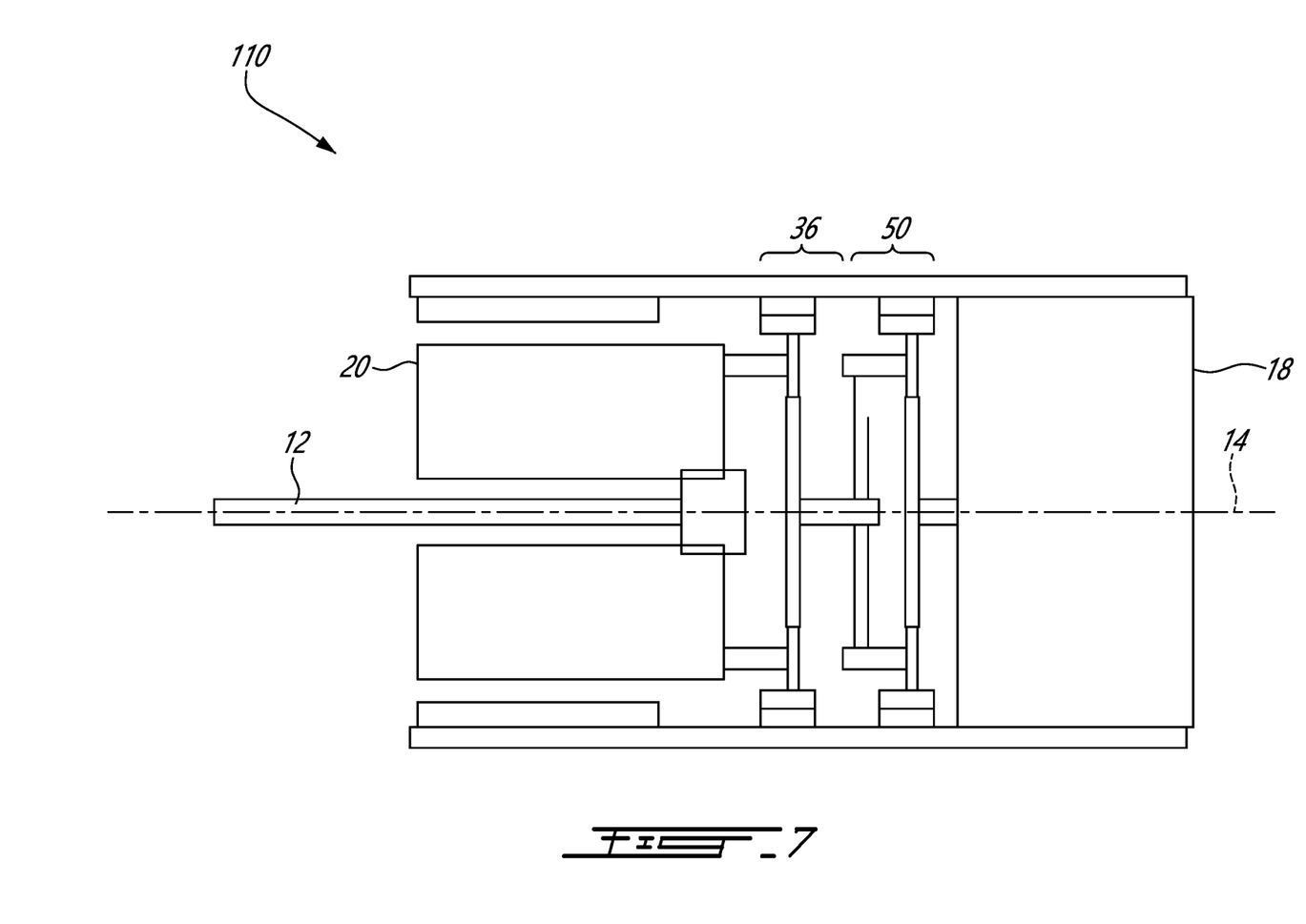
FIG. 7 is a schematic cross-sectional view of an other example of a hybrid aircraft power plant.

FIG. 7 presents another example embodiment of a power plant 110. This example embodiment includes various components of the power plant 10 which will not be further described to avoid redundancy. However, it will be noted that an additional epicyclic gearing 50 is present in this embodiment between thermal engine 18 and epicyclic gearing 36. Such an additional epicyclic gearing 50 may be used to preserve an in-line (coaxial) configuration in an embodiment where thermal engine is a gas turbine engine, for instance, rather than a Wankel or piston engine.

Figure 8:
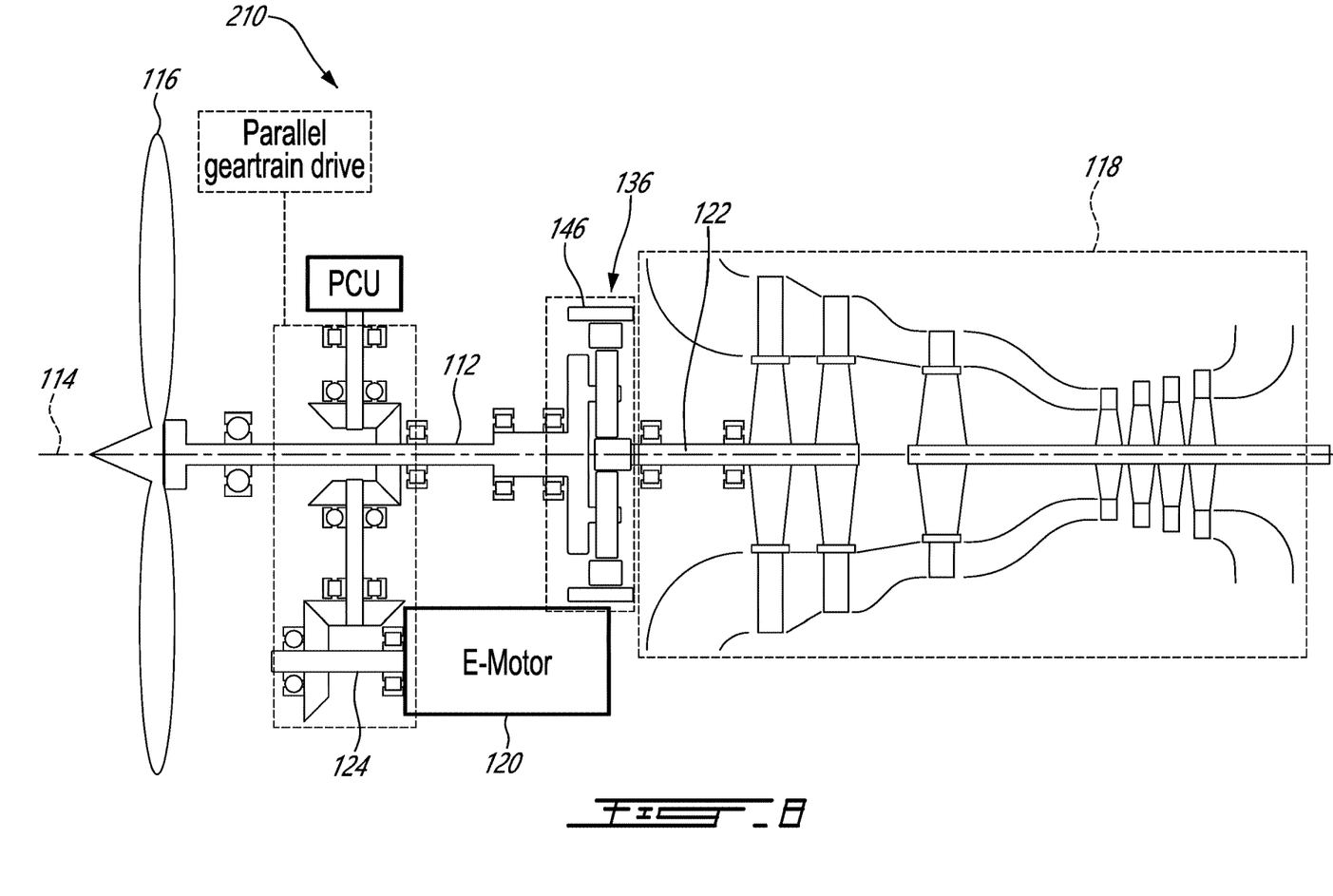
FIG. 8 is a schematic cross-sectional view of an other example of a hybrid aircraft power plant.

FIG. 8 presents yet another example embodiment of a power plant 210 being drivingly connected to propeller 116. In this example, the power plant 210 is drivingly connected to propeller 116 via an output shaft 112. The output shaft 112 rotates about an axis 114. Propeller 116 may be a variable pitch propeller. Power plant 210 may include a thermal engine 118 and an electric motor 120. In an embodiment of power plant 210, thermal engine 118 and electric motor 120 may be arranged in parallel and each be selectively operable to drive the propeller 116 or not independently from the other. More specifically, in the example presented in FIG. 8, the thermal engine 118 has a thermal engine shaft 122, and the electric motor 120 has a rotor shaft 124. An epicyclic gearing 136 couples the thermal engine 118, electric motor 120 and output shaft 112, as will be detailed below.

An overrunning clutch 146 (freewheel clutch) is provided between the ring gear and the structure. The overrunning clutch 146 is a passive, one-way clutch, which disengages the ring gear from the structure automatically, allowing the ring gear to rotate in one direction (which may be referred to as a first angular direction), when the power output of the thermal engine 118 is smaller than the sum of the power output of the electric motor 120 and of a potentially non-zero power output of the propeller 116 which may occur when windmilling the propeller 116. When the power output of the thermal engine 118 is greater than the sum of the power output of the electric motor 120 and of a potentially non-zero power output of the propeller 116, the overrunning clutch engages the ring gear to the structure, preventing the ring gear from rotating in the other direction (which may be referred to as the second angular direction).

In this embodiment, the rotor shaft 124 is not coaxial to the output shaft 112, but offset from axis 114. The rotor shaft 124 is connected to the output shaft 112 via a geartrain which may or may not include a speed change, such as rotation speed reduction or rotation speed increase. The rotor shaft 124 is coupled to the epicyclic gearing via the output shaft 112 or to the carrier 44.

The computer(s) 32 or computing devices of the controller may be the same or different types of devices. Note that the controller can be implemented as part of a full-authority digital engine controls (FADEC) or other similar device, including electronic engine control (EEC), engine control unit (ECU), electronic propeller control, propeller control unit, and the like. In some embodiments, the controller is implemented as a Flight Data Acquisition Storage and Transmission system, such as a FAST™ system. The controller may be implemented in part in the FAST™ system and in part in the EEC. Other embodiments may also apply.

The computer(s) 32 comprises a processing unit and a memory which has stored therein computer-executable instructions. The processing unit may comprise any suitable devices configured to implement a method such that instructions, when executed by the computer(s) or other programmable apparatus, may cause the functions/acts/steps performed to control the mode of operation of the engine to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may comprise any suitable known or other machine-readable storage medium. The memory may comprise non-transitory computer readable storage medium, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory may comprise any storage means (e.g., devices) suitable for retrievably storing machine-readable instructions 506 executable by processing unit.

The methods and systems for controlling the engine described herein may be implemented in a high level procedural or object oriented programming or scripting language, or a combination thereof, to communicate with or assist in the operation of a computer system, for example the computer(s). Alternatively, the methods and systems may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or more specifically the processing unit of the computing device, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

While the description may present method and/or process steps as a particular sequence, it is understood that to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. As used herein, the term "about" is intended to allow for a 10% variation of the associated numerical values.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Other applications would be recognized by the person of ordinary skill in the art and are considered to be within the scope of the present disclosure. Yet further modifications could be implemented by a person of ordinary skill in the art in view of the present disclosure, which modifications would be within the scope of the present technology.

The invention claimed is:

1. A hybrid aircraft power plant comprising
a structure;
an output shaft connectable to a load, the output shaft rotatable about an axis relative the structure;
a thermal engine secured to the structure, the thermal engine having a thermal engine shaft;
an electric motor having a stator and a rotor shaft, the stator secured to the structure, wherein the electric motor is coaxial to the output shaft, and axially overlaps the output shaft;
an epicyclic gearing having a sun gear coaxial to a ring gear, a plurality of planet gears meshed between the sun gear and the ring gear, and a carrier coaxial to the sun gear and to the ring gear, the sun gear, the carrier, and the ring gear being rotatable relative the structure, the output shaft and the rotor shaft both coupled to the carrier, and the thermal engine shaft coupled to the sun gear; and
an overrunning clutch coupling the ring gear to the structure, the overrunning clutch allowing rotation of the ring gear in a first angular direction, and preventing rotation of the ring gear in a second angular direction, the second angular direction opposite the first angular direction.

2. The hybrid aircraft power plant of claim 1 wherein the overrunning clutch is operable to engage the ring gear with the structure to prevent rotation of the ring gear when the epicyclic gearing is driven by the thermal engine, the structure being a casing.

3. The hybrid aircraft power plant of claim 1 wherein the overrunning clutch is integrated to a bearing, the bearing and the overrunning clutch having a non-rotary portion secured to the structure, and a rotary portion secured to the ring gear, further comprising a lubricant delivery line extending through the non-rotary portion.

4. The hybrid aircraft power plant of claim 3 wherein the overrunning clutch is located axially adjacent the bearing.

5. The hybrid aircraft power plant of claim 3 wherein the overrunning clutch is disposed axially between two bearing elements of the bearing.

6. The hybrid aircraft power plant of claim 1 wherein the bearing element is disposed axially between two portions of the overrunning clutch.

7. The hybrid aircraft power plant of claim 1 wherein the load is a propeller, and the overrunning clutch is operable to engage the ring gear with the structure to prevent rotation of the ring gear when the power output of the thermal engine is greater than a combined power output of the electric motor and of any windmilling of the propeller.

8. The hybrid aircraft power plant of claim 1 wherein the overrunning clutch is a sprag clutch.

9. The hybrid aircraft power plant of claim 1 wherein the sun gear, the ring gear, and the carrier are coaxial to the output shaft.

10. The hybrid aircraft power plant of claim 1 wherein the thermal engine shaft is coaxial to the output shaft.

11. The hybrid aircraft power plant of claim 10 wherein the epicyclic gearing is a first epicyclic gearing, further comprising a second epicyclic gearing coupled between the thermal engine shaft and the first epicyclic gearing.

12. An aircraft power plant comprising:
a casing;
an output shaft connected to an air mover, the output shaft rotatable about an axis;
a thermal engine having a thermal engine shaft coaxial with the output shaft;
an electric motor having a rotor shaft;
an epicyclic gearing having a sun gear coaxial to a ring gear and to the output shaft, a plurality of planet gears meshed between the sun gear and the ring gear, and a carrier coaxial to the sun gear and to the ring gear, the sun gear, the carrier, and the ring gear being rotatable relative the casing, the sun gear coupled to the thermal engine shaft, and the carrier coupled to the rotor shaft and to the output shaft; and
an overrunning clutch coupled between the ring gear and the casing, the overrunning clutch operable to engage the ring gear to the casing, preventing rotation of the ring gear, when rotated in a direction of rotation corresponding to a direction of rotation of the thermal engine shaft:
wherein the air mover is a propeller, further comprising a geartrain coupling the electric motor to the output shaft, the electric motor being offset from the axis and coupled to the carrier via the output shaft.

13. The aircraft power plant of claim 12 wherein the overrunning clutch is integrated to a bearing, the bearing and the overrunning clutch having a non-rotary portion secured to the casing, and a rotary portion secured to the ring gear, further comprising a lubricant delivery line extending through the non-rotary portion.

14. The aircraft power plant of claim 13 wherein the overrunning clutch is located axially adjacent the bearing.

15. The aircraft power plant of claim 13 wherein the overrunning clutch is disposed axially between two bearing elements of the bearing.

16. The aircraft power plant of claim 13 wherein the bearing element is disposed axially between two portions of the overrunning clutch.

17. The aircraft power plant of claim 13 wherein the overrunning clutch is a sprag clutch.

18. A hybrid aircraft power plant comprising a structure;
an output shaft connectable to a load, the output shaft rotatable about an axis relative the structure;
a thermal engine secured to the structure, the thermal engine having a thermal engine shaft;
an electric motor having a stator and a rotor shaft, the stator secured to the structure;
an epicyclic gearing having a sun gear coaxial to a ring gear, a plurality of planet gears meshed between the sun gear and the ring gear, and a carrier coaxial to the sun gear and to the ring gear, the sun gear, the carrier, and the ring gear being rotatable relative the structure, the output shaft and the rotor shaft both coupled to the carrier, and the thermal engine shaft coupled to the sun gear; and
an overrunning clutch coupling the ring gear to the structure, the overrunning clutch allowing rotation of the ring gear in a first angular direction, and preventing rotation of the ring gear in a second angular direction, the second angular direction opposite the first angular direction; wherein the overrunning clutch is integrated to a bearing, the bearing and the overrunning clutch having a non-rotary portion secured to the structure, and a rotary portion secured to the ring gear, further comprising a lubricant delivery line extending through the non-rotary portion.

\* \* \* \* \*